United States Patent [19]

Okuda

[11] Patent Number: 5,105,785
[45] Date of Patent: Apr. 21, 1992

[54] IGNITION TIMING CONTROL APPARATUS

[75] Inventor: Hiroshi Okuda, Himeji, Japan

[73] Assignee: Mitsubishi Denki Kabushiki Kaisha, Tokyo, Japan

[21] Appl. No.: 536,570

[22] PCT Filed: Oct. 5, 1989

[86] PCT No.: PCT/JP89/01025

§ 371 Date: Jul. 13, 1990

§ 102(e) Date: Jul. 13, 1990

[51] Int. Cl.⁵ .............................................. F02P 5/155
[52] U.S. Cl. .................................... 123/423; 123/424; 123/602
[58] Field of Search ................ 123/423, 424, 427, 413, 123/602

[56] References Cited

U.S. PATENT DOCUMENTS

| 3,935,845 | 2/1976 | Aono et al. | 123/423 |
| 4,612,899 | 9/1986 | Honjo et al. | 123/413 |
| 4,633,834 | 1/1987 | Takeuchi et al. | 123/424 |
| 4,844,034 | 7/1989 | Honjo et al. | 123/602 |
| 4,986,239 | 1/1991 | Oishi | 123/423 |

FOREIGN PATENT DOCUMENTS

| 50-22129 | 3/1975 | Japan . |
| 54-142428 | 11/1979 | Japan . |
| 56-104154 | 3/1981 | Japan . |
| 56-115854 | 9/1981 | Japan | 123/413 |
| 59-183052 | 10/1984 | Japan . |

Primary Examiner—Andrew M. Dolinar
Attorney, Agent, or Firm—Sughrue, Mion, Zinn, Macpeak and Seas

[57] ABSTRACT

An ignition timing control apparatus is disclosed which controls ignition timing of an internal combustion engine which is used with a marine vehicle. The apparatus, which controls ignition timing in dependence upon the opening degree of a throttle valve, includes a retardation moderating circuit for gradually changing the output of the throttle sensor when the throttle valve is driven in the closing direction, thereby preventing the engine from stalling during sudden decelerations of the engine.

4 Claims, 4 Drawing Sheets

IGNITION TIMING CONTROL APPARATUS

TECHNICAL FIELD

The present invention relates to an ignition timing control apparatus for changing the ignition timing of an internal combustion engine in accordance with the opening degree of a throttle valve which operates to adjust the amount of intake air sucked into the engine.

BACKGROUND ART

Conventionally, ignition timing control apparatus have been known which operates to change ignition timing of an internal combustion engine in accordance with the opening degree of a throttle valve which adjusts the amount of intake air sucked into the engine. In such ignition timing control apparatus, ignition timing is controlled in proportion to the change rate of the opening degree of a throttle valve as shown in FIG. 1. Specifically, as shown in FIG. 1(a), as the throttle opening changes from the closed state toward the fully open state, ignition timing is controlled to advance as shown in FIG. 1(b). On the other hand, as the throttle opening changes from the fully open state toward the closed state, ignition timing is controlled to retard in proportion to the rate of change of the throttle opening.

With a marine vehicle, for example, equipped with such an ignition timing control apparatus, however, brake is often applied to suddenly decelerate the vehicle by changing the engine operation from a forward drive into a rearward drive so as to make the propellant screw blade revolve in a reverse direction. In this case, the engine is subjected to an abrupt increase in load because the screw blade is brought into the rearward drive in spite of the marine vehicle still remaining in a forward driving state.

On the other hand, upon such a change in the drive condition of the engine, the opening degree of the throttle is normally in a fully closed state and ignition timing is thus at the most retarded piston position, so the engine is easily caused to stall due to an abrupt change in the load on the engine.

The present invention is proposed to solve the above-described problems, and has for its object the provision of an ignition timing control apparatus which is able to prevent a marine engine from being stalled upon rapid decelerations of a marine vehicle.

DISCLOSURE OF THE INVENTION

Specifically, the present invention comprises a throttle sensor for outputting a voltlage which is in inverse proportion to the opening degree of a throttle valve, a retardation moderating ciruit for receiving the output signal of the throttle sensor and having a diode connected in parallel with a resistor of an integration circuit, an ignition timing calculation circuit for outputting an ignition timing control signal which advances in inverse proportion to the output voltage of the retardation moderating circuit, wherein when the throttle opening changes toward the closing direction, the output of the retardation moderation circuit is controlled to gradually increase so that the ignition timing changes more gradually than the throttle opening does.

In addition, the present invention further comprises a timer circuit for disabling the output of the ignition timing calculation circuit for a predetermined time from the engine starting period, and a compensation circuit for increasing the output voltage of the retardation moderating circuit to a prescribed value so as to stabilize the engine operation during engine starting.

THE BEST MODE FOR EMBODYING THE PRESENT INVENTION

The present invention will now be described in detail with reference to the accompanying drawings.

Figure 1:
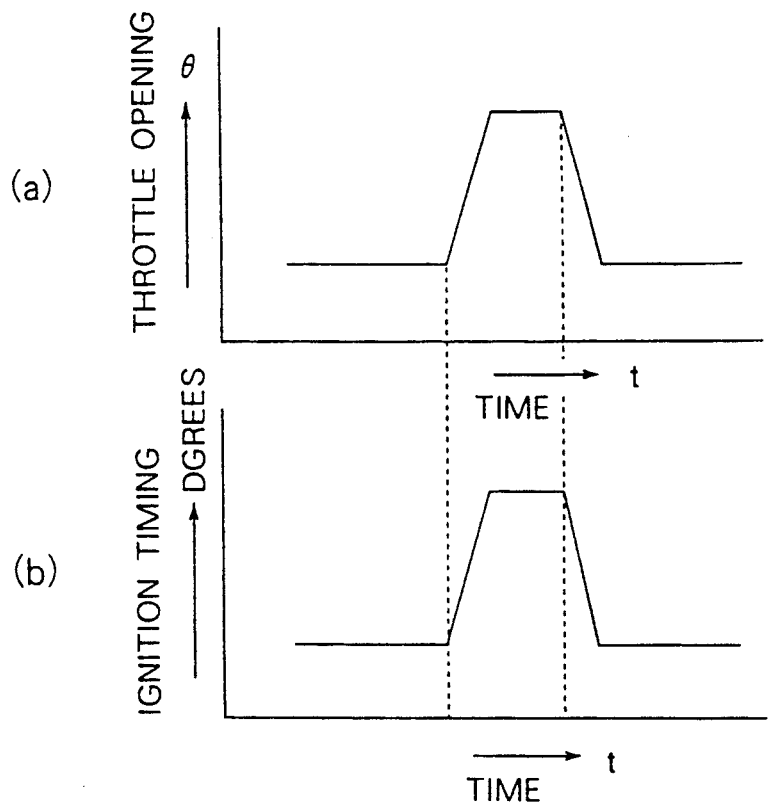
FIG. 1 is a characteristic view showing the relationship between ignition timing and throttle opening in a conventional ignition timing control apparatus.
Figure 2:
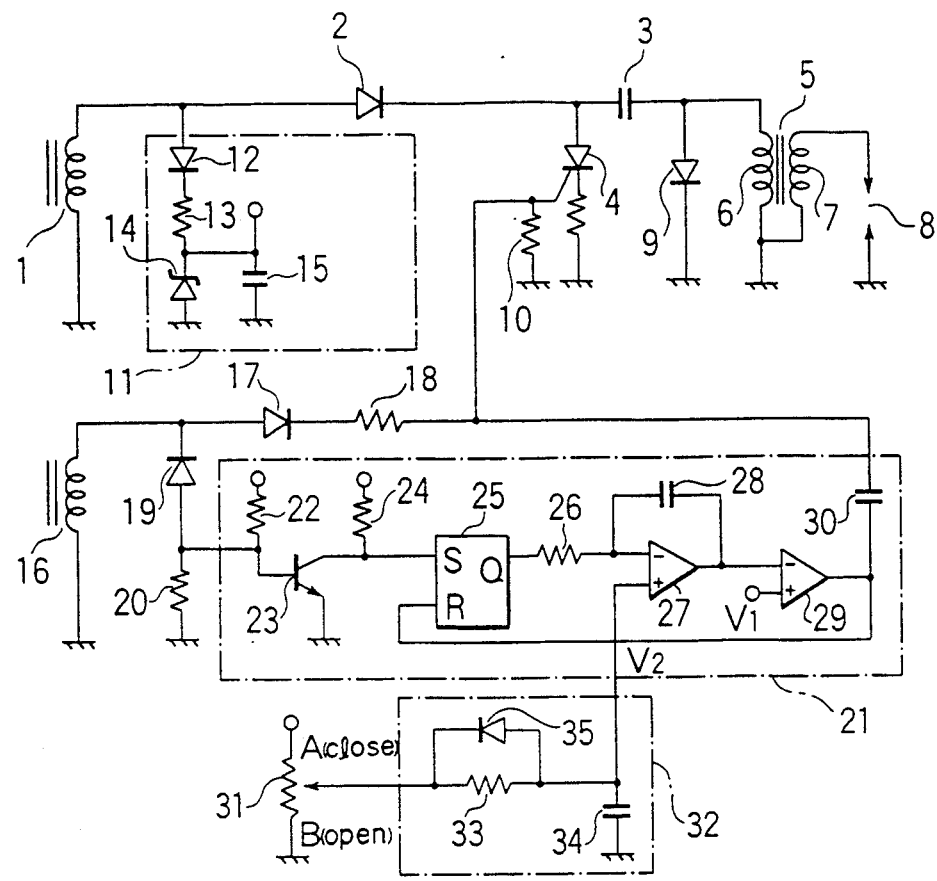
FIG. 2 is a circuit diagram showing an ignition timing control apparatus of a first embodiment of the present invention.

FIG. 2 shows a circuit diagram of an ignition timing control apparatus in accordance with first embodiment of the present invention. In the drawings, reference numeral 1 designates a generator coil for a magneto which is adapted to be driven by an engine, the generator coil having one end connected with an ignition capacitor 3 through a diode 2 and the other end connected to ground. Reference numeral 4 designates a thyristor for discharging the capacitor 3 through an ignition coil 5, the thyristor constituting a switching element. Reference numerals 6 and 7 designate the primary and secondary windings of the ignition coil 5. Reference numeral 8 designates a spark plug connected in series with the secondary coil 7. Reference numeral 9 designates a counter electromotive force absorbing diode connected in parallel with the primary winding 6 for absorbing a counter electromagnetic force of the ignition coil 5. Reference numeral 10 designates a biasing resistor connected between the gate and the cathode of the thyristor 4.

Further, reference numeral 11 designates a power circuit including a diode 12, a resistor 13 and a Zener diode 14 which are serially connected with each other and which are connected between one end of the generator coil 1 and ground. A capacitor 15 is connected in parallel with the Zener diode 14, with a junction between the Zener diode 14 and the resistor 13 forming the output terminal of the power circuit.

Reference numeral 16 designates a signal coil for generating an ignition signal in synchrony with the rotation of the engine. The signal coil has one end connected via a diode 17 and a resistor 18 with the gate of the thyristor 4, as well as to ground via a diode 19 and a resistor 20, and it has the other end thereof grounded. Reference numeral 21 designates an ignition timing calculation circuit which receives the output signal of the signal coil 16 and the output signal of a retardation moderating circuit 32 which is to be described later for calculating a proper ignition timing, the ignition timing calculation circuit having an output terminal connected to the gate of the thyristor 4. Specifically, a junction between the diode 19 and the resistor 20 is connected with a junction between one end of the resistor 22 and the base of the transistor 23, the resistor 22 being connected at the other end thereof to a power source. The transistor 23 has a collector connected to the power source via a resistor 24 as well as to a set terminal S of a flip-flop 25, and it also has an emitter connected to ground. The flip-flop 25 has a Q output terminal connected via resistor 26 to a negative input terminal of an operation amplifier 27. A capacitor 28 is connected between the negative input terminal and the output terminal of the operation amplifier 27. The operational amplifier 27 has a positive input terminal connected to the output terminal of the retardation moderating circuit 32. The output terminal of the operational amplifier 27 is connected to a negative input terminal of a comparator 29 which has a positive input terminal connected to the power source. The comparator 29 has an output terminal connected to the gate of the thyristor 4 via a capacitor 30, and to a reset terminal R of the flip-flop 25.

Reference numeral 31 designates a throttle sensor operatively connected with a throttle valve, which operates to adjust the amount of intake air sucked into the engine, for sensing the opening degree of the throttle valve. The throttle sensor 31 generates an output voltage which increases as the throttle valve is driven in the closing direction A, and decreases as the throttle valve is driven in the opening direction B.

The retardation moderating circuit 32 comprises an integration circuit including a resistor 33, a capacitor 34 and a diode 35 which is connected in parallel with the resistor 33 with its cathode connected with the output side of the throttle sensor 31.

Now, the operation of this embodiment will be described hereinbelow. The output of the generator coil 1 is rectified by the diode 2 and charged to the capacitor 3. The signal generator 16 generates an ignition signal in synchrony with the rotation of the engine. The signal generator output contains a positive pulse, which is directly imposed on the gate of the thyristor 4 through the diode 17, and a negative pulse, which is inputted to the ignition timing calculation circuit 21. When a negative ignition signal is inputted to the ignition timing calculation circuit 21, the transistor 23 is turned off to set the flip-flop 25 whereby the capacitor 28 begins to discharge through the Q output terminal of the flip-flop 25, resistor 26, capacitor 28 and the output terminal of the operational amplifier 27. When the output voltage of the operational amplifier 27 becomes lower than a reference voltage $V_1$ which is imposed on the positive input terminal of the comparator 29, the output signal of the comparator 29 changes form the low level "0" to the high level "1". The high level output of the comparator 29 is then differentiated by the capacitor 30 and imposed on the gate of the thyristor 4 as an ignition timing control signal. At the same time, the flip-flop 25 is reset so that the output at the Q output terminal thereof changes from the high level "1" to the low level "0", thus interrupting the discharge of the capacitor 28. At this time, current begins to be supplied to the capacitor 28 through the output terminal of the operational amplifier 27, capacitor 28, resistor 26 and the Q output terminal of the flip-flop 25. Subsequently, when the output voltage of the operational amplifier 27, which increases in accordance with the discharge of the capacitor 28, exceeds the reference voltage $V_1$ at the positive input terminal of the comparator 29, the output level of the comparator 29 changes from "1" to "0". The discharging current continues to flow until a next ignition signal is inputted to the ignition timing calculation circuit 21.

Here, it is to be noted that the interval in the engine rotational angle or crank angle between the instant when an ignition signal is inputted to the ignition timing calculation circuit 21 and the instant when a corresponding ignition timing control signal is outputted is expressed as a linear function of the output voltages $V_2$ of the retardation moderating circuit 32. That is to say, the higher the output voltage $V_2$, the greater the ignition timing control signal moves in the ignition-retarding direction, whereas the lower the output voltage $V_2$, the greater the ignition timing control signal moves in the ignition-advancing direction. The thyristor 4 is made conductive by either of an ignition timing control signal and an ignition signal of the signal coil 16, causing the capacitor 3 to discharge. As a result, current flows from the capacitor 3 to the primary winding 6 of the ignition coil 5 to produce a high voltage on the secondary winding 7 so that the spark plug 8 can spark at a proper ignition time.

Figure 3:
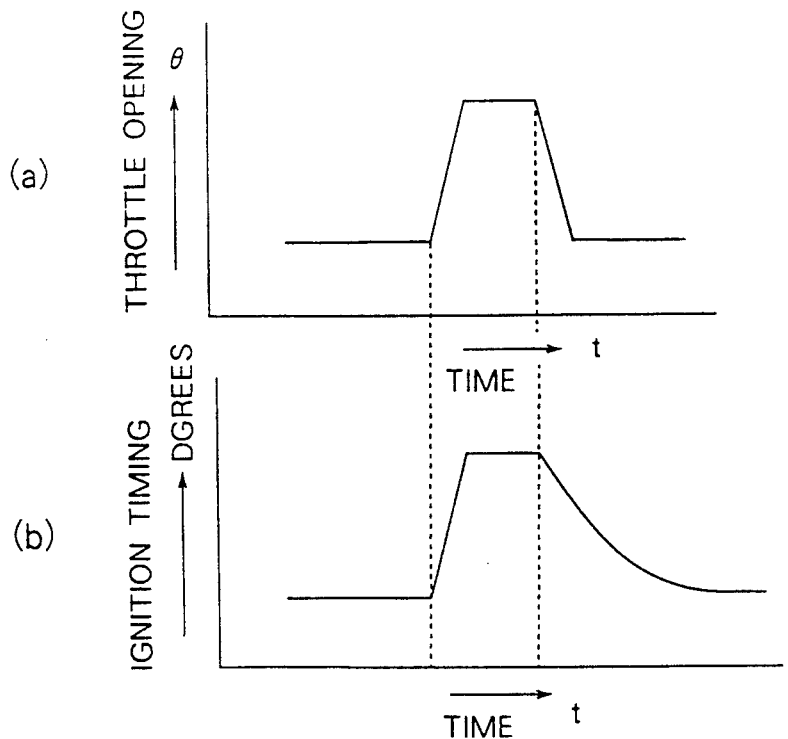
FIG. 3 is a characteristic view showing the relationship between ignition timing and throttle opening in the apparatus of FIG. 2.

Although the output voltage $V_2$ of the retardation moderating circuit 32 varies in dependence upon the output of the throttle sensor 31, the rate of change of the output voltage of the output voltage $V_2$ to the throttle sensor output when the throttle opening changes in the closing direction is different from that when it changes in the opening direction. Specifically, as the throttle valve moves from the fully closed position A to the fully open position B, the output voltage of the throttle sensor 31 decreases and the capacitor 34 discharges through the diode 35 so that the output voltage $V_2$ of the retardation moderating circuit 32 decreases rapidly. On the other hand, as the throttle valve moves from the fully open position B to the fully closed position A, variations in the output voltage of the throttle sensor 31 are integrated so that the output voltage $V_2$ of the retardation moderating circuit 32 increases gradually. Accordingly, when the throttle opening changes in the manner as shown in FIG. 3(a), the ignition timing follows the change of throttle opening in the ignition-advancing direction, but it changes gradually in the ignition-retarding direction, as clearly seen from FIG. 3(b).

Thus, when the operation of the marine engine is suddenly changed from a forward dirve to a rearward dirve, the throttle valve is held in the fully closed state during the time when the engine is changed from the neutral condition into the rearward drive condition. At this time, ignition takes place at a crank angle in advance of the maximum retardation angular position. Accordingly, since the engine is switched into the rearward driving operation under this state, there is no danger of the stable engine operation being impaired even if the engine is abruptly loaded, thus preventing engine stall upon change in engine operation.

Figure 4:
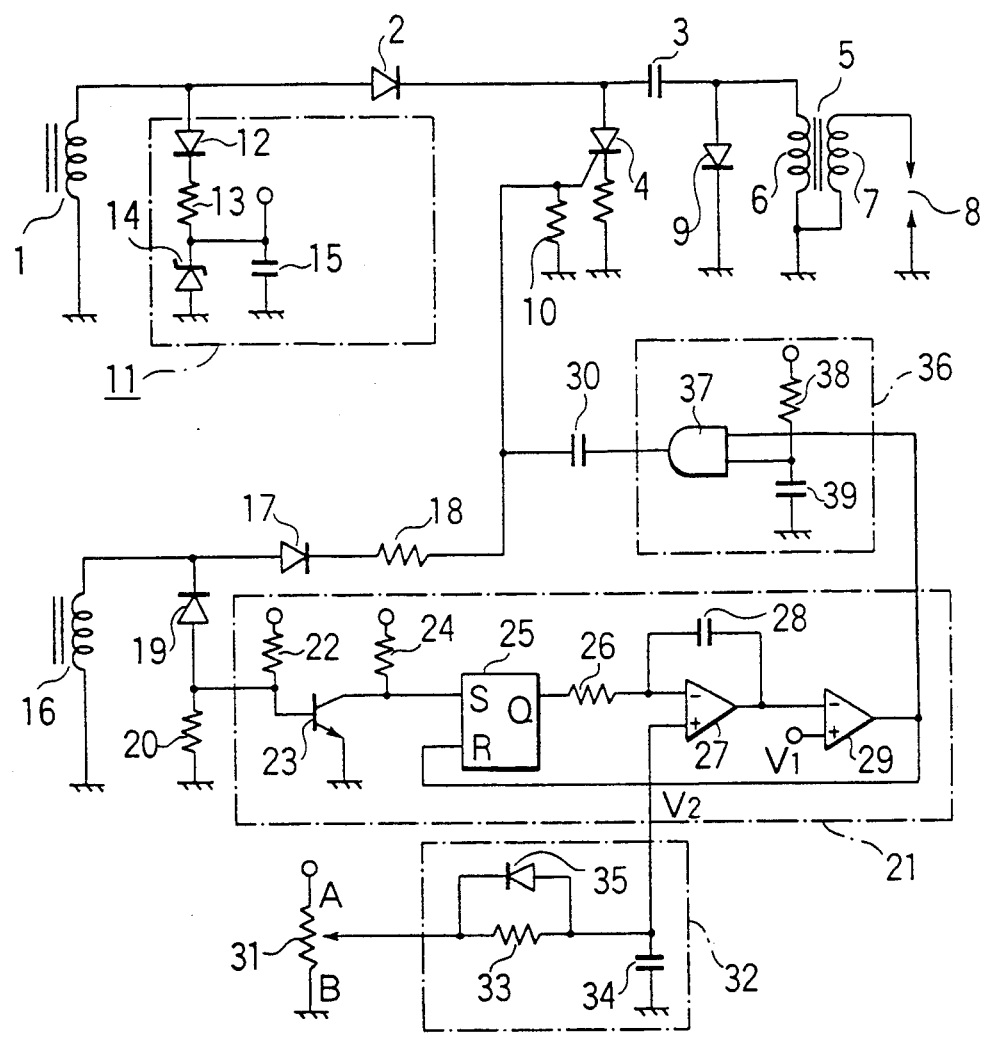
FIG. 4 is a circuit diagram showing an ignition timing control apparatus of a second embodiment of the present invention.

FIG. 4 shows a circuit diagram of a second embodiment of the present invention. In this embodiment, a timer circuit 36 is provided between the ignition timing calculation circuit 21 and the gate of the thyristor 4. Specifically, the comparator 29 has an output terminal connected to a first input terminal of an AND gate 37 which has a second input terminal connected to a junction between a resistor 37 and a capacitor 39 which are connected in series with the power source and ground. The AND gate 37 has an output terminal connected via capacitor 30 to the gate of the thyristor 4. The respective arrangements other than the above of this embodiment are similar to those of the previous embodiment, and hence the corresponding parts are designated by the same symbols, omitting a further explanation thereof.

Next, the operation of the ignition timing control apparatus of this second embodiment as constructed above will be described. When the engine is started, the throttle valve is fully closed and the output signal of the throttle sensor 31 is at the high voltage level. At this time, the capacitor 34 of the retardation moderating circuit 32 is in a discharged condition and the output voltage $V_2$ of the retardation moderating circuit 32 is substantially zero. Since the capacitor 34 is charged through the resistor 33, however, the output voltage $V_2$ of the retardation moderating circuit 32 increases gradually. That is, even when the throttle valve is in the fully closed position, the output voltage $V_2$ of the retardation moderating circuit 32 remains below a specified voltage corresponding to the fully closed position of the throttle valve for a predetermined time from the engine starting period so that it outputs a signal in the throttle opening direction. As a result, the ignition timing calculation circuit 21 outputs an ignition timing control signal which is an ignition-advancing signal.

Normally, ignition timing is retarded during the engine starting period because, otherwise, there will be a defect that stable rotation of the engine after having been started is imparied. Thus, in this embodiment, the timer circuit 36 operates to disable the output of the ignition timing calculation circuit 21 for a predetermined time from the engine starting period so that ignition can take place by a positive output pulse of the signal coil 16. That is, the input voltage at the second input terminal of the AND gate 37 is held at the low level for the predetermined time after power is turned on for engine starting, and therefore even if an ignition timing control signal in the ignition-advancing direction is inputted to the first input terminal of the AND gate 37, the output of the AND gate 37 remains at the low level. The predetermined time set by the timer circuit 36 is usually 2-5 seconds, this being done by selecting an appropriate resistance and an appropriate capacitance for the resistor 38 and the capacitor 39. After this time has elapsed, normal ignition timing control is carried out by the output signal of the ignition timing calculation circuit 21.

Figure 5:
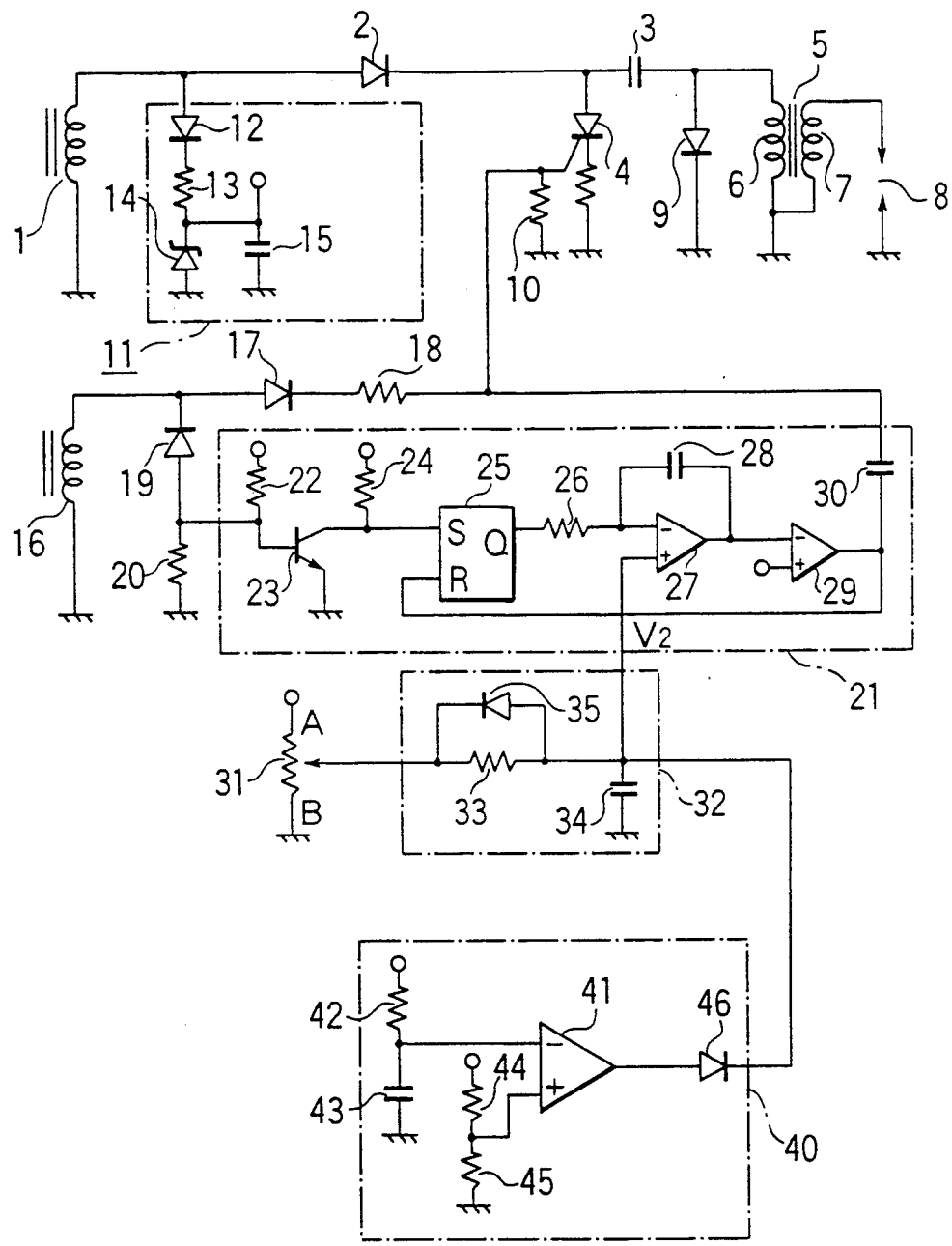
FIG. 5 is a circuit diagram showing a third embodiment of the present invention.

FIG. 5 shows a circuit diagram of a third embodiment of the present invention which is equipped with a compensation circuit 40 for raising the output voltage $V_2$ of the retardation moderating circuit 32 to a prescribed level for a predetermined time from the engine starting period. In this FIGURE, 41 designates a comparator which has a negative input terminal connected with a junction between a resistor 42 and a capacitor 43, and a positive input terminal connected with a junction between resistors 44, 45. The serially connected resistor 42 and capacitor 43 and the serially connected resistors 44, 45 are connected with the power source. The comparator 41 has an output terminal connected via a diode 46 to the output terminal of the retardation moderating circuit 32. The respective arrangements other than the above of this embodiment are similar to those of FIG. 2.

With the ignition timing control apparatus as constructed above, during engine starting, the output voltage of the throttle sensor 31 is at the high level, as described before, but the output voltage $V_2$ of the retardation moderating circuit 32 is held at zero because the capacitor 34 is in the discharged condition. In this state, however, when the power is turned on for engine starting, a voltage divided by the resistors 44, 45 is imposed on the positive input terminal of the comparator 41 of the compensation circuit 40, the voltage at the negative input terminal of which is held lower than the voltage at the positive input terminal for a predetermined time (e.g., 1 second or less in this embodiment) which is determined by a time constant with which the capacitor 43 is charged, the time constant being set by the resistor 42 and capacitor 43. Therefore, the comparator 41 generates an output signal of the high voltage level which is fed to the output terminal of the retardation moderating circuit 41 whereby the output voltage $V_2$ thereof immediately rises. As a result, the ignition timing calculation circuit 21 generates an ignition timing control signal in the ignition retarding direction so as to prevent the ignition timing from being excessively advanced. Thereafter, when the voltage at the negative input terminal of the comparator 41 increases above the positive terminal voltage, the output terminal thereof becomes low. Also, the output voltage of the retardation moderating circuit 32 is blocked by the diode 46 so that ignition timing is therafter controlled in the same manner as in the first embodiment. In addition, in this embodiment, since the normal ignition timing control is resumed in a relatively short period of time, followability of the throttle valve after engine starting is accordingly improved.

As described in the foregoing, according to the present invention, a retardation moderating circuit is provided which functions, when the opening degree of a throttle valve is changed in the closing direction, to move ignition timing in the ignition-retarding direction more gradually than the change in the throttle opening. This serves to prevent engine stalling which would otherwise occur at such a time as when a marine engine is changed into the rearward diriving operation.

Further, if a timer circuit is provided, it is possible to prevent ignition from taking place at an excessively advanced ignition timing during the engine starting period, ensuring stable engine starting operation.

Moreover, if a compensation circuit is provided, it is possible to perform stable engine starting operation as well as improve followability of a throttle valve after engine starting.

I claim:

1. An ignition timing control apparatus comprising a generator coil and a signal coil each driven by an engine for generating an output, an ignition capacitor being charged by the output of said generator coil and being discharged through a switching element in response to the output signal of said signal coil, an ignition coil for generating a high voltage by a discharging current of said capacitor so as to spark an ignition plug, a throttle sensor for outputting an output signal corresponding to the opening degree of a throttle valve, an ignition timing calculating circuit for calculating an ignition timing corresponding to the output of said throttle sensor with the output signal of said signal coil being taken as a reference, and supplying an ignition timing control signal to said switching element, and a retardation moderating circuit for gradually changing the output of said throttle sensor supplied to said ignition timing calculation circuit when said throttle valve is driven in the closing direction.

2. An ignition timing control apparatus as claimed in claim 1, wherein said throttle sensor is constructed such that it generates a voltage which is in inverse proportion to the opening degree of said throttle valve, and said retardation moderating circuit comprises an integration circuit for integrating the output voltage of said throttle sensor, and a diode connected in parallel with a resistor of said integration circuit with such a polarity as to block the output voltage of said throttle sensor.

3. An ignition timing control apparatus as claimed in claim 1 or 2, further comprising a timer circuit for detecting an engine starting period, and disabling the output of said ignition timing calculation circuit for a predetermined time from the detection of the engine starting period so that the output signal of said signal coil constitutes the ignition signal during the engine starting period.

4. An ignition timing control apparatus as claimed in claim 1 or 2, further comprising a compensation circuit for detecting an engine starting period and raising the output voltage of said retardation moderating circuit to a prescribed level for a predetermined time from the detection of the engine starting period.

* * * * *